United States Patent
Durham et al.

(10) Patent No.: US 10,287,487 B2
(45) Date of Patent: *May 14, 2019

(54) METHOD FOR THE USE OF NITRATES AND NITRATE REDUCING BACTERIA IN HYDRAULIC FRACTURING

(71) Applicant: Multi-Chem Group, LLC, San Angelo, TX (US)

(72) Inventors: Danny K. Durham, The Woodlands, TX (US); Michael L. Harless, Humble, TX (US)

(73) Assignee: MULTI-CHEM GROUP LLC, Houston, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/589,171

(22) Filed: May 8, 2017

(65) Prior Publication Data

US 2017/0240802 A1    Aug. 24, 2017

Related U.S. Application Data

(62) Division of application No. 14/755,186, filed on Jun. 30, 2015, now Pat. No. 9,683,433, which is a division of application No. 13/213,781, filed on Aug. 19, 2011, now Pat. No. 9,096,789.

(60) Provisional application No. 61/385,011, filed on Sep. 21, 2010.

(51) Int. Cl.
| | | |
|---|---|---|
| *E21B 43/22* | (2006.01) | |
| *E21B 43/16* | (2006.01) | |
| *C09K 8/62* | (2006.01) | |
| *C09K 8/68* | (2006.01) | |
| *E21B 43/26* | (2006.01) | |
| *C09K 8/528* | (2006.01) | |

(52) U.S. Cl.
CPC ............... *C09K 8/62* (2013.01); *C09K 8/528* (2013.01); *C09K 8/68* (2013.01); *E21B 43/16* (2013.01); *E21B 43/26* (2013.01); *C09K 2208/20* (2013.01); *C09K 2208/28* (2013.01)

(58) Field of Classification Search
CPC .. E21B 41/0064; E21B 43/2401; E21B 43/30; E21B 43/243; E21B 43/267; E21B 41/02; E21B 43/16
See application file for complete search history.

(56) References Cited

U.S. PATENT DOCUMENTS

| | | |
|---|---|---|
| 5,181,567 A | 1/1993 | Shuler |
| 5,750,392 A | 5/1998 | Hitzman et al. |
| 6,125,761 A | 10/2000 | Smith et al. |
| 6,309,597 B1 | 10/2001 | Ballinger et al. |
| 7,413,890 B1 | 8/2008 | Hince et al. |
| 7,514,058 B1 | 4/2009 | Hitzman et al. |
| 2009/0229827 A1 | 9/2009 | Bryant et al. |
| 2010/0190666 A1 | 7/2010 | Ali et al. |
| 2010/0200239 A1 | 8/2010 | Allen |
| 2010/0212888 A1 | 8/2010 | Hendrickson et al. |
| 2011/0166050 A1 | 7/2011 | Li et al. |

FOREIGN PATENT DOCUMENTS

| | | |
|---|---|---|
| CA | 2689187 A1 | 6/2010 |
| WO | 9612867 A1 | 5/1996 |
| WO | 2007051961 A1 | 5/2007 |

OTHER PUBLICATIONS

Gevertz, et al., "Isolation and Characterization of Strains CVO and FWKO B, Two Novel Nitrate-Reducing, Sulfide-Oxidizing Bacteria isolated from Oil Field Brine", Applied and Environmental Microbiology, p. 2491-2501, Jun. 2000, (11 pages).
International Search Report and Written Opinion for International Application No. PCT/US2011/001465 dated Jan. 24, 2012, (8 pages).
International Preliminary Report on Patentability for International Application No. PCT/US2011/001465 dated Mar. 26, 2013, (7 pages).
Examination Report issued in related GB Application No. 1601446.6 dated Apr. 15, 2016 (5 pages).
Ineos Upstream, 2015, Chemical Additives used in Fracturing, ineos.com [online], http://www.ineos.com/globalassets/ineos-group/business/ineos-upstream/literature/chemicals-additivesv3.pdf (5 pages).
Petrowiki, 2014, Fracturing fluids and additives, petrowiki.org, [online] http://petrowiki.org/Fracturing_fluids_and_additives (4 pages).
Ken Cohen, 2011, "Fracking" fluid disclosure: why its important, Exxonmobilperspectives.com [online], http://www.exxonmobilperspectives.com/2011/08/25/fracking-fluid-disclosure-why-its-important-2/ (3 pages).
Fracfocus, 2011, Chemical use in hydraulic fracturing, fracfocus.org [online] https://fracfocus.org/water-protection/drilling-usage (2 pages).
US Department of Energy, 2010, Hydraulic fracturing fluids—composition and additives, geology.com [online] http://geology.com/energy/hydraulic-fracturing-fluids/ (4 pages).
Hector Partidas, 2003, Oil and gas wells down hole deposit buildup, Mission Critical Magazine [online] https://www.missioncriticalmagazine.com/ext/resources/whitepapers/partidas-papers.pdf (7 pages).
Office Action issued in related GB Application No. 1601446.6, dated Aug. 10, 2016 (4 pages).

*Primary Examiner* — Zakiya W Bates
(74) *Attorney, Agent, or Firm* — Tenley Krueger; Baker Botts L.L.P.

(57) ABSTRACT

A slick water fracturing fluid including a brine, an inorganic nitrate, a nitrogen reducing bacteria, a scale inhibitor selected from the group consisting of a polyacrylate polymer, a polyacrylate copolymer, a polyacrylate terpolymer, and mixtures thereof, and a friction reducer, wherein the friction reducer is a polyacrylamide.

20 Claims, No Drawings

METHOD FOR THE USE OF NITRATES AND NITRATE REDUCING BACTERIA IN HYDRAULIC FRACTURING

CROSS-REFERENCE TO RELATED APPLICATIONS

This application claims priority to and is a divisional application of U.S. patent application Ser. No. 14/755,186, filed Jun. 30, 2015, and entitled "METHOD FOR THE USE OF NITRATES AND NITRATE REDUCING BACTERIA IN HYDRAULIC FRACTURING," which is a divisional application of U.S. patent application Ser. No. 13/213,781, filed Aug. 19, 2011, and entitled "METHOD FOR THE USE OF NITRATES AND NITRATE REDUCING BACTERIA IN HYDRAULIC FRACTURING," the entire disclosures of which are incorporated herein by reference; and to U.S. Provisional Application 61/385,011, filed Sep. 21, 2010, and entitled "METHOD FOR THE USE OF NITRATES AND NITRATE REDUCING BACTERIA IN HYDRAULIC FRACTURING".

BACKGROUND OF THE DISCLOSURE

The present disclosure relates generally to the field of fracturing fluids used in fracturing subterranean formations during hydrocarbon recovery. More specifically the present disclosure relates to methods for introducing additives in fracturing fluids to supplement or replace traditional biocides.

Hydraulic fracturing is a formation stimulation technique used to create additional permeability in a producing formation to increase the flow of hydrocarbons toward the wellbore. Typically, during a hydraulic fracturing operation, a high hydraulic pressure is used to fracture the subterranean formation, creating cracks that facilitate the increased flow of hydrocarbons. Often, proppants are used to keep cracks open that are created during the fracturing operation.

Fracturing fluids include a number of components and are most often water-based. These components typically include acids, biocides, breakers, corrosion inhibitors, friction reducers, gels, iron control chemicals, oxygen scavengers, surfactants and scale inhibitors. Fracturing fluids that contain friction reducers to allow higher flow rates are most often termed "slick water" fracturing fluids.

In most traditional hydraulic fracturing operations, much of the fracturing fluid used is recovered. However, in certain formations and operations, the majority of the fracturing fluid that enters the subterranean formation is not initially recovered, but, instead, remains in the formation. This is particularly true for small pore-sized, low permeability formations such as gas-producing shale formations. Some shales may have unfractured permeabilities of 0.01 to 0.00001 millidarcies. Effective porosity of shales may be 0.2% or less. As a result, it may be possible to initially recover only 15% or less of the fracturing fluid, with the rest of the fracturing fluid remaining in situ.

The unrecovered fracturing fluid in the formation may provide a fertile breeding ground for the anaerobic bacteria present in the hydrocarbon-producing formation. Certain types of bacteria, for example, sulfate reducing bacteria (SRB), can be detrimental to both the recovery of the hydrocarbon and the hydrocarbon itself. SRB act to reduce sulfates to sulfides which are detrimental to both the formation itself, as well as to the hydrocarbon recovered. For instance, the SRB may create sludge or slime, which can reduce the porosity of the formation and thereby impede hydrocarbon recovery. SRB may also produce hydrogen sulfide which may sour the hydrocarbon, as well as cause corrosion in metal tubulars and surface equipment.

Typical fracturing fluids include a biocide in order to control of the action of bacteria such as SRB. However, some of these biocides, such as, for instance, glutaraldehye, present environmental issues. Ground water may be contaminated with the biocide, for instance, during fracturing operations, or through spills of fracturing fluids at the surface. Further, more reactive biocides such as oxidizers tend to have a limited life in the formation. This limited life may present a serious problem in low porosity, low permeability formations, where fracturing fluids may remain for a significant period of time due to low mobility.

Other problems exist with traditional fracturing fluids where environmentally sensitivity is an issue. For instance, certain friction reducers and scale inhibitors may be toxic.

What is needed is a method of controlling undesirable bacteria, such as SRB, in small pore-sized, low permeability formations without the use of traditional biocides during hydraulic fracturing operations. Further, what is needed is a fracturing fluid with less toxic components than traditional fracturing fluids.

SUMMARY OF THE DISCLOSURE

The compounds and methods described herein relate generally to the field of gas and oil production. Other uses may also be made of same. In particular, compositions and methods for controlling the growth of sulfate reducing bacteria are described.

In one embodiment of the present disclosure, a method of controlling sulfides in a low porosity, low permeability subterranean formation is disclosed which includes injecting an inorganic nitrate into the formation.

In another embodiment of the present disclosure, a slick water fracturing fluid is disclosed which includes, a brine, an inorganic nitrate, a nitrogen reducing bacteria, a scale inhibitor. The scale inhibitor is a polyacrylate polymer, a polyacrylate copolymer, a polyacrylate terpolymer, or mixtures thereof. The slick water fracturing fluid further includes a friction reducer that is a polyacrylamide.

DETAILED DESCRIPTION

In the present disclosure, inorganic nitrates or inorganic nitrites are injected with the fracturing fluid to stimulate nitrate-reducing bacteria or nitrate reducing sulfide oxidizing bacteria (NRSOB) (generically, "NRB") as a control mechanism for SRB in place of a traditional biocide in a low porosity, low permeability subterranean formation, such as shale. Molybdates also may be used in conjunction with the inorganic nitrates as a control mechanism for SRB.

SRB and NRB typically compete for the same non-polymer carbon source (such as acetates) present in the subterranean formation needed for gro'"1:h of bacteria. By increasing the growth rate of the NRB in comparison to the SRB, the NRB may out compete the SRB in consumption of the available non-polymer carbon source, depriving the SRB of its ability to grow and create the undesirable sulfides. Further, by inhibiting the growth rate of the SRB, the NRB may predominate, again out competing the SRB for the available non-polymer carbon in the subterranean formation.

Often, in low permeability, low porosity formations such as shales, recovery of the fracturing fluid is limited due to limited mobility; as a result, a significant portion of the fracturing fluid may remain in the formation for weeks and even months. Short acting biocides typically used to control the growth of SRB are often ineffective in such applications, as their efficacy may be limited to mere hours or days, allowing SRB growth following the initial biocide use. Other traditional persistent biocides may represent a health risk, in that spills or migration into groundwater may create an undesirable hazard. In contrast, the mechanism of the current disclosure may increase in efficacy with time, as the NRB out compete the SRB with time, and, with respect to NRSOB, may serve to mediate damage done by SRB. Further, the NRB does not pose the health or environmental risks related to the traditional biocides.

Inorganic nitrates serve to stimulate the growth of the NRB present in the subterranean formation or the water that serves as a basis for the fracturing fluid, thus outcompeting SRB present in the formation. Inorganic nitrates may be used as part of the fracturing fluid injected into the subterranean formation. Inorganic nitrates available for use in the present disclosure include, for instance, potassium nitrate, sodium nitrate, ammonium nitrate, and mixtures thereof. These inorganic nitrates are commonly available, but are non-limiting and any appropriate inorganic nitrate may be used.

The amount of inorganic nitrate included as part of the fracturing fluid is dependent upon a number of factors, including the amount of sulfate in the hydrocarbon, the amount of sulfate in the fracturing fluid itself, the permeability of the formation, and the expected amount of NRB needed to counteract the SRB. Typical concentration of inorganic nitrate in the fracturing fluid is less than 2000 ppm by weight of the solution. More often, the concentration of inorganic nitrate is between 500 to 1000 ppm by weight, most often between about 700 and 800 ppm by weight.

NRB are often indigenous in the subterranean formation or already present in the fracturing fluid and simple addition of the inorganic nitrate may be adequate to stimulate the NRB to outcompete SRB for the non-polymer carbon source. However, in certain circumstances, such as when the indigenous amount of NRB is inadequate or wholly absent, it may be necessary to supplement the indigenous NRB with suitable additional NRB in the fracturing fluid. Thus, in certain embodiments of the present disclosure, NRB are added to the fracturing fluid.

Those of ordinary skill in the art with the benefit of this disclosure will recognize acceptable examples of NRB appropriate for use in this disclosure. NRB include any type of microorganism capable of performing anaerobic nitrate reduction, such as heterotrophic nitrate-reducing bacteria, and nitrate-reducing sulfide-oxidizing bacteria. This may include, but is not limited to, *Campylobacter* sp. *Nitrobacter* sp., *Thiobacillus* sp., *Nitrosomonas* sp., *Thiomicrospira* sp., *Sulfurospirillum* sp., *Thauera* sp., *Paracoccus* sp., *Pseudomonas* sp., *Rhodobacter* sp., or Specific examples include, but are not limited to, *Nitrobacter vulgaris, Nitrosomonas europea, Pseudomonas stutzeri, Pseudomonas aeruginosa, Paracoccus denitrificans, Sulfurospirillum deleyianum*, and *Rhodobacter sphaeroides*.

The amount of NRB included in the fracturing fluid will depend upon a number of factors including the amount of SRB expected, as well as the permeability and porosity of the subterranean formation. In certain embodiments of the present disclosure, the amount of NRB in the fracturing fluid is between 1 and $10^8$ bacteria count/ml of the fracturing fluid, preferably between $10^1$ and $10^4$ bacteria count/ml of the fracturing fluid.

NRB of the present disclosure may convert inorganic nitrates to nitrites. In addition, in certain embodiments of the present disclosure, the NRB of the present disclosure also may convert nitrites to ammonia. In certain other embodiments of the present disclosure, the NRB of the present disclosure may convert ammonia to nitrogen gas. Thus, in addition to adding nitrates to the fracturing fluid, in certain embodiments of the present disclosure, inorganic nitrites may also be added to the fracturing fluid. It has further been found that nitrites may scavenge hydrogen sulfide, further reducing the souring of the hydrocarbon produced. Inorganic nitrites include, for instance sodium nitrite and potassium nitrite and are typically added in the range of between about 5 and 100 ppm by weight of the fracturing fluid.

In addition to stimulating the NRB to out compete the SRB, it may be desirable to introduce additional SRB inhibitors in certain embodiments of the present disclosure together with the inorganic nitrates. Examples of SRB inhibitors suitable for the present disclosure are 9,10-anthraquinone, molybdates and molybdate salts, such as sodium molybdate and lithium molybdate, although any SRB inhibitor may be used in concentrations where the molybdates do not unduly affect the ability of the NRB to otherwise out compete the SRB. In certain embodiments of the present disclosure, molybdate is added to the fracturing fluid in the range of 5 to about 100 ppm by weight of fluid.

Thus, as described in the present disclosure, less effective and less environmentally-sensitive biocides may be replaced with long-acting alternatives, particularly in low porosity, low permeability formations, such as shale. In addition, it may be advantageous, particularly in environmentally sensitive situations, such as where possibility of ground water contamination exists, to substitute other toxic components of traditional slick water fracturing fluids with less toxic alternatives.

For example, traditional fracturing fluids use scale inhibitors to reduce scale buildup in the formation or production equipment that may precipitate from the brine used as a base for the fracturing fluid. In certain embodiments of the present disclosure, polyacrylate polymers, copolymers, and terpolymers have been found to be compatible with nitrates and NRBs, effective and present few, if any, environmental issues.

As another example, slick water hydraulic fracturing fluids include friction reducers. Latex polymers and copolymers of polyacrylamides have been found to be compatible with nitrates and NRBs, effective, and present, few if any, environmental issues.

This disclosure will now be further illustrated with respect to certain specific examples which are not intended to limit the disclosure, but rather to provide more specific embodiments as only a few of many possible embodiments.

Example 1

A fracturing fluid may be prepared with sufficient sodium nitrate to bring the sodium nitrate concentration in the fracturing fluid to about 800 ppm by weight. The fracturing fluid may then be injected into a hydrocarbon-producing, subterranean shale formation.

Example 2

A fracturing fluid may be prepared in accordance with Example 1. *Sulfurospirillum deleyianum* may be added to the fracturing fluid in sufficient amounts to bring the concentration of the NRB to about $10^2$ bacteria count/ml fracturing fluid. The fracturing fluid may then be injected as in Example 1.

Example 3

A fracturing fluid may be prepared in accordance with Example 1. Sodium molybdate may be added to the fracturing fluid in sufficient amount to bring the concentration of the sodium molybdate to 50 ppm by weight of fracturing fluid.

While the disclosure has been described with respect to a limited number of embodiments and examples, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of controlling sulfides in a subterranean formation, comprising:
   injecting a fluid comprising an inorganic nitrate and a friction reducer into the subterranean formation; and
   allowing the inorganic nitrate to increase the growth rate of nitrogen-reducing bacteria in the formation so as to inhibit the growth rate of sulfate-reducing bacteria in the formation.

2. The method of claim 1 wherein the inorganic nitrate is selected from the group consisting of potassium nitrate, sodium nitrate, ammonium nitrate, and mixtures thereof.

3. The method of claim 1 further comprising: injecting nitrogen reducing bacteria into the subterranean formation.

4. The method of claim 1 wherein the nitrogen reducing bacteria is selected from the group consisting of *Campylobacter* sp. *Nitrobacter* sp., *Nitrosomonas* sp., *Thiomicrospira* sp., *Sulfurospirillum* sp., *Thauera* sp., *Paracoccus* sp., *Pseudomonas* sp., *Rhodobacter* sp., *Desulfovibrio* sp., and mixtures thereof.

5. The method of claim 4 wherein nitrogen reducing bacteria is *Nitrobacter vulgaris, Nitrosomonas europea, Pseudomonas stutzeri, Pseudomonas aeruginosa, Paracoccus denitrificans, Sulfurospirillum deleyianum*, and *Rhodobacter sphaeroides*.

6. The method of claim 1 further comprising: injecting a molybdate or molybdate salt into the subterranean formation.

7. The method of claim 6 wherein the molybdate salt is selected from the group consisting of sodium molybdate, lithium molybdate, and mixtures thereof.

8. The method of claim 1 further comprising: injecting 9, 10-anthraquinone into the subterranean formation.

9. The method of claim 1 wherein no effective amount of a biocide is introduced into the subterranean formation.

10. The method of claim 1 wherein the subterranean formation comprises a low permeability subterranean formation.

11. The method of claim 1 wherein the fluid further comprises a brine.

12. The method of claim 1 wherein the fluid further comprises a scale inhibitor.

13. The method of claim 1 wherein the fluid further comprises a molybdate or molybdate salt.

14. The method of claim 1 wherein the fluid further comprises 9, 10-anthraquinone.

15. A method of controlling sulfides in a subterranean formation, comprising:
    injecting a fluid comprising an inorganic nitrate into the subterranean formation, wherein the fluid comprises a gel; and
    allowing the inorganic nitrate to increase the growth rate of nitrogen-reducing bacteria in the formation so as to inhibit the growth rate of sulfate-reducing bacteria in the formation.

16. The method of claim 15 wherein the fluid does not comprise an effective amount of a biocide.

17. The method of claim 15 wherein the fluid further comprises a molybdate or molybdate salt.

18. The method of claim 15 wherein the fluid further comprises 9, 10-anthraquinone.

19. The method of claim 15 wherein the fluid further comprises a scale inhibitor.

20. The method of claim 15 wherein the fluid further comprises a brine.

* * * * *